United States Patent [19]

Iijima et al.

[11] Patent Number: 4,825,352
[45] Date of Patent: Apr. 25, 1989

[54] PROCESS CONTROL SYSTEM AND METHOD THEREOF

[75] Inventors: Tadahiko Iijima, Hitachi; Takumi Kawai, Katsuta; Yasuhiro Tennichi; Sadao Yanada, both of Hitachi, all of Japan

[73] Assignee: Hitachi, Ltd., Tokyo, Japan

[21] Appl. No.: 29,094

[22] Filed: Mar. 23, 1987

[30] Foreign Application Priority Data

Mar. 24, 1986 [JP] Japan ............................ 61-64087

[51] Int. Cl.⁴ .................... G04F 5/00; G04G 3/00
[52] U.S. Cl. ............................ 364/140; 364/494; 364/900; 364/200; 364/569; 364/143
[58] Field of Search ............. 364/184, 186, 492, 494, 364/176, 140, 143, 569, 200 MS File, 900 MS File

[56] References Cited

U.S. PATENT DOCUMENTS

| 4,129,901 | 12/1978 | Masuda | 364/184 |
| 4,310,877 | 1/1982 | Richaud | 364/184 |
| 4,459,259 | 7/1984 | Colley | 364/492 |
| 4,500,950 | 2/1985 | Putman | 364/176 |
| 4,500,951 | 2/1985 | Sugimoto et al. | 364/186 |
| 4,687,946 | 8/1987 | Jones | 364/494 |

FOREIGN PATENT DOCUMENTS 54-98480 8/1979 Japan .
59-65301 4/1984 Japan .

Primary Examiner—Jerry Smith
Assistant Examiner—Paul Gordon
Attorney, Agent, or Firm—Antonelli, Terry & Wands

[57] ABSTRACT

A process control system has a timer circuit which fixes operational periods by issuing an instruction for starting each of a plurality of time periods in such a manner that the computation of control blocks will occur during periods of fixed duration. A periodic operation selection circuit selects control blocks to be computed within each time period in response to an instruction from the timer circuit. Control blocks selected by the periodic operation selection circuit and an instruction for completion of the computation of control blocks for each time period are stacked in an operation instruction circuit, which issues an instruction for consecutively executing the operation of the control blocks and an instruction for effecting an idle operation after completion of the operation of control blocks for each time period. When an instruction for starting an ensuing time period is issued from the timer circuit at a time when computation of a control block has not been completed within a predetermined time period, an operation completion determining circuit issues an instruction for starting the computation of the ensuing time period beginning with computation of the remaining control blocks in the predetermined time period and an instruction for stacking control blocks in the ensuing time period in the operation instruction circuit by means of the periodic operation selection circuit.

4 Claims, 5 Drawing Sheets

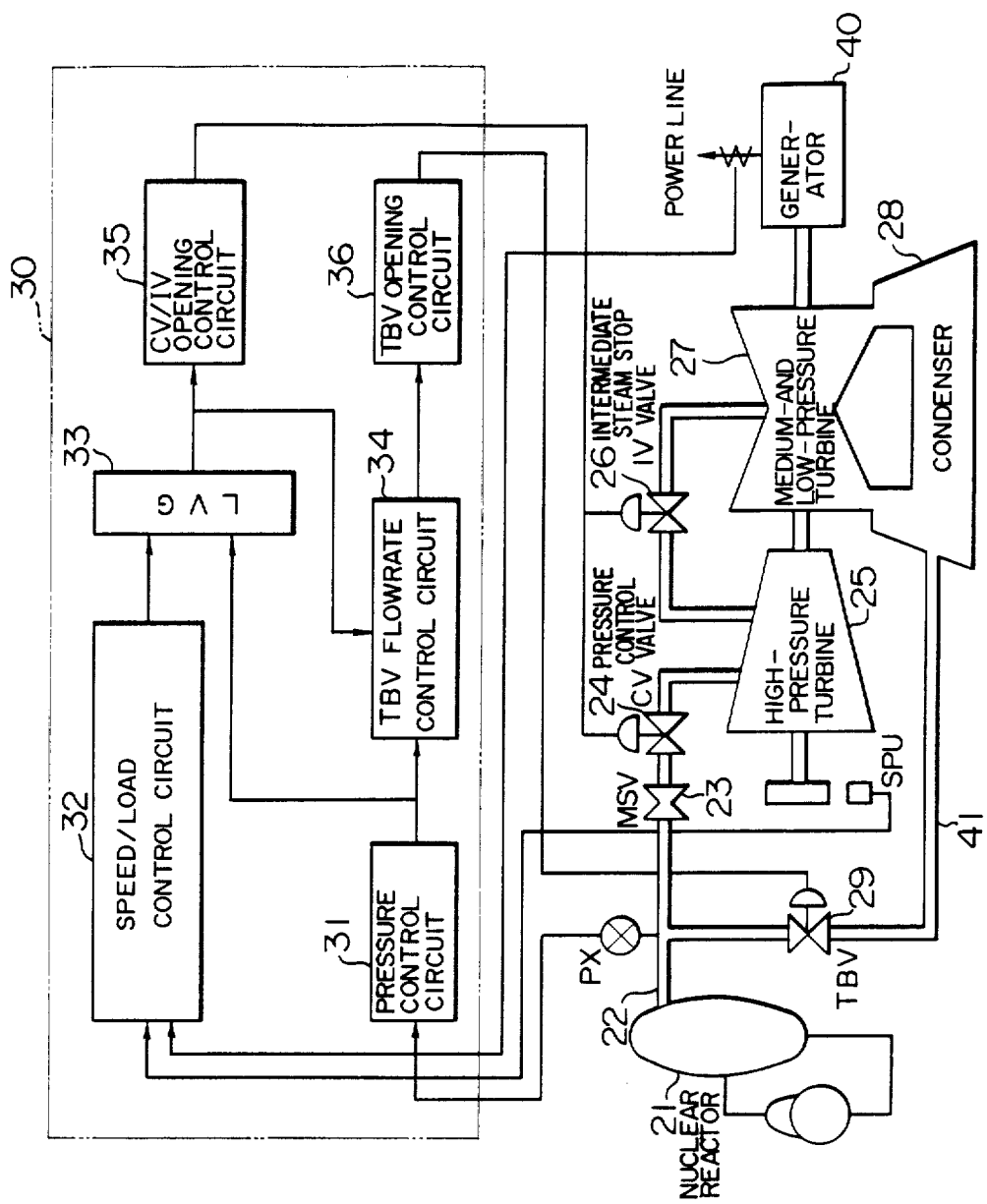
F I G. 1

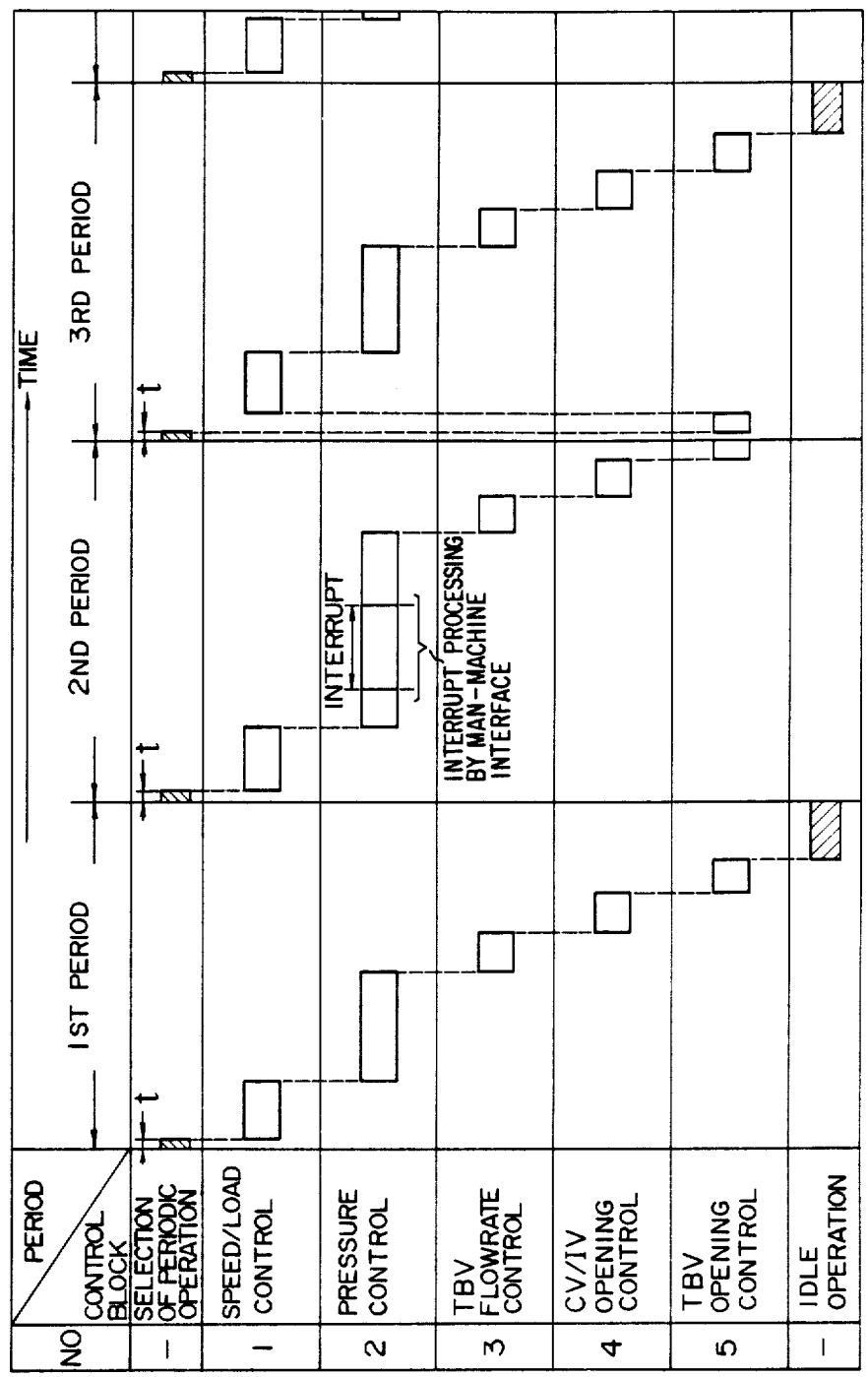
F I G. 5

PROCESS CONTROL SYSTEM AND METHOD THEREOF

Background of the Invention

1. FIELD OF THE INVENTION

The present invention relates to a process control system and a method of undertaking the same for the purpose of controlling a plant of any of various kinds by applying predetermined operational signals to various items of equipment within the plant over which control is to be maintained.

2. Description of the Prior Art

Hitherto, process control systems have been known which are adapted to control plants of various kinds by periodically repeating the computation of various control factors. Among such known systems, one type sets the operational periods within which control factors are computed at fixed short periods in order to improve response characteristics (i.e., setting is made in such a manner that the computation to be undertaken in one period will be completed within a short period of time), and the control factors are classified in accordance with their degree of importance, the computation of control factors of low priority not being effected when it becomes impossible to complete the computation of all scheduled control factors within each operational period. Another system is known which is adapted to reduce the length of each operational period by refraining from performing the computation of any unnecessary operational factors during a period, thereby improving response characteristics. These systems are disclosed in, for instance, Japanese Patent Unexamined Publication Nos. 65301/1984 and 98480/1979.

The aforementioned prior art systems, however, have a drawback in that cases emerge where such systems cannot suitably be used for controlling a plant which is complex and large in size and hence requires a correspondingly complicated system of control. In other words, in a control system used for controlling a steam turbine in a nuclear or thermal power plant, for instance, higher response characteristics and a more stabilized level of control have come to be necessary in conjuction with the tendency for turbines and generators to become large in size in consequence of the recent increase in the generating capacity of single units, and cases are therefore encountered where the aforementioned prior art systems are incapable of meeting such requirements.

With the former type of prior art, there is no continuity in operations since, when it has become impossible to complete the operations of all the scheduled control factors during a predetermined operational period, the arrangement is such that the operation proceeds to the next period without performing the computation of the remaining operational factors during that period. There is therefore a possibility of losing control stability or giving rise to erroneous outputs. Also, the latter type of prior art is not suited either to applications which require continuity in computation, as described above.

SUMMARY OF THE INVENTION

Accordingly, a primary object of the present invention is to provide a process control system and a method thereof which allow high response characteristics and allow control stability to be maintained by establishing operational periods with fixed short durations and by periodically and continuously performing the computation of predetermined operational factors, and which are capable of maintaining control stability in such a manner that, even if it is not possible to complete the computation of all the control factors or control blocks within each operational period, the continuity of computation will never be lost.

Another object of the present invention is to provide a process control system and a method thereof which are particularly suitable to applications involving the control of a steam turbine of a nuclear or thermal power plant.

Namely, in accordance with one aspect of the present invention, there is provided a process control system, comprising: a timer circuit for issuing an instruction for starting each of a plurality of periods in such a manner that the computation of control blocks will be repeated in periods of fixed duration; a periodic operation selection circuit for selecting control blocks to be computed within each period in response to an instruction from the timer circuit; an operation instruction circuit which stacks control blocks selected by the periodic operation selection circuit and an instruction for completion of the computation of control blocks for each period and which issues an instruction for consecutively executing the operation of the control blocks and an instruction for effecting an idle operation after completion of the operation of control blocks for each period; and an operation completion determining circuit which, when an instruction for starting an ensuring period is issued from the timer circuit at a time when computation of control blocks has not been completed within a predetermined duration period, issues an instruction for starting the computation of the ensuing period beginning with computation of the remaining control blocks in the predetermined period and an instruction for stacking control blocks in the ensuing period in the operation instruction circuit by means of the periodic operation selection circuit by cancelling the instruction for completion of the predetermined period.

In accordance with another aspect of the present invention, there is provided a process control method, comprising the steps of: instructing the starting of each of a plurality of periods by means of a timer circuit in such a manner that the computation of control blocks will be repeated in periods of fixed duration; selecting control blocks to be computed within each period by means of a periodic operation selection circuit in response to an instruction from the timer circuit; stacking selected control blocks and an instruction for completion of each period in an operation instruction circuit and causing the operation instruction circuit to issue instructions for consecutively executing the computation of the control blocks and an instruction for performing an idle operation after completion of each period; and issuing an instruction for starting the computation of an ensuing period beginning with the computation of remaining control blocks of a predetermined period and an instruction for causing the computation of control blocks of the ensuing period to be performed such as to continue the computation of the remaining control blocks without performing an idle operation of the predetermined period at a time when an instruction for starting the ensuing period has been issued from the timer circuit when the computation of control blocks has not been completed during the predetermined period.

Other objects, features, and advantages of the present invention will become apparent from the detailed description of the preferred embodiments when read in conjunction with the accompanying drawings.

BRIEF DESCRIPTION OF THE DRAWINGS

FIG. 1 is a schematic diagram illustrating a process control system in accordance with an embodiment of the present invention which is arranged as a system for controlling a steam turbine of a nuclear power plant;

FIG. 5 is a diagram schematically illustrating a mode in which the operation of control blocks is carried out periodically and continuously in the control system.

DETAILED DESCRIPTION OF THE PREFERRED EMBODIMENTS

Figure 2:
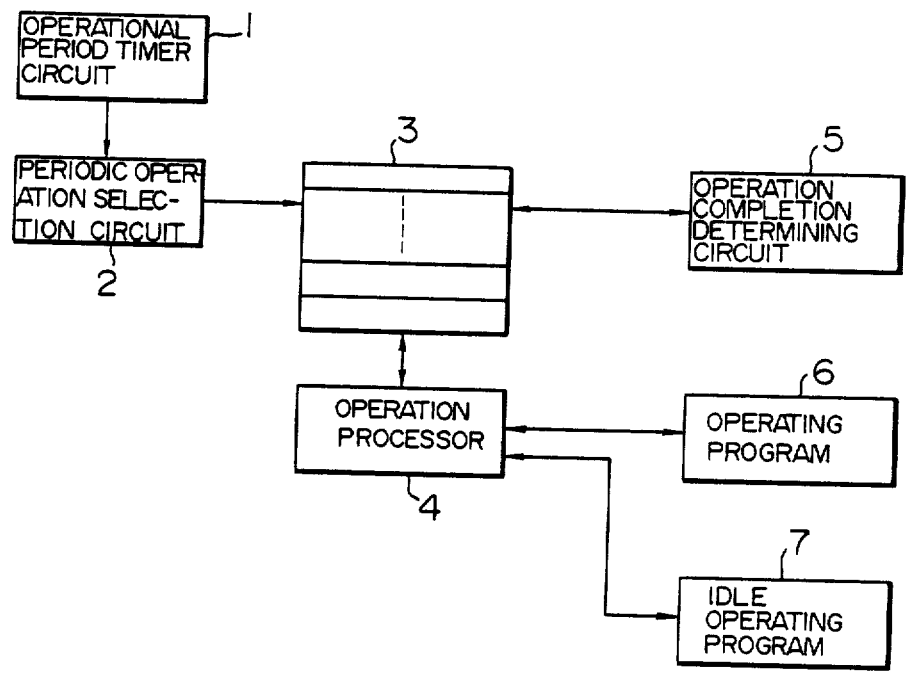
FIG. 2 is a diagram illustrating an operation processing unit in the control system.

FIG. 1 shows a process control system in accordance with an embodiment of the present invention. This system is arranged as a control system 30 for a steam turbine of a nuclear power plant. In the illustrated nuclear power plant, steam generated from a nuclear reactor 21, i.e., the source of generating steam for operating a turbine, is introduced into a high-pressure turbine 25 via a main steam stop valve (MSV) 23 and a steam control valve (CV) 24. The steam which has done work in the high-pressure turbine 25 is led to a medium- and low-pressure turbine 27 via an intermediate steam stop valve (IV) 26, and the steam which has finished work at the medium- and low-pressure turbine is led to a condenser 28, thereby constituting the so-called Rankine period. In addition, a generator 40 generates electric power on receiving the rotational force of the turbine 27. This plant is provided with a bypass line 41 which has a turbine bypass valve (TBV) 29 and directly leads the steam generated from the nuclear reactor into the condenser 28. The power plant per se of the type described above is already known.

A steam turbine controller 30 of the illustrated embodiment is provided with the following: a speed and load control circuit 32 into which a turbine speed signal, detected by a speed pick-up (SPU), and a generator output signal are applied; a pressure control circuit 31 into which a steam pressure signal applied via a pressure transmitter (PX); a turbine bypass valve (TBV) flowrate control circuit 34 into which an output signal of the pressure control circuit 31 and an output signal of a low value gate (LVG) 33 are applied; a CV/IV opening control circuit 35 into which an output signal of the low value gate 33 is applied, this circuit 35 being adapted to generate an output signal for controlling the opening of the steam control valve (CV) 24 and the intermediate steam stop valve (IV) 26; and a TBV opening control circuit 36 into which an output signal from the TBV flowrate control circuit 34 is applied, this circuit 36 being adapted to produce an output signal for controlling the opening of the turbine bypass valve (TBV) 29. Accordingly, controller 30 is adapted to detect the turbine speed, generator output, and steam pressure and to control the opening of the turbine bypass valve 29, the steam control valve 24, and the intermediate steam stop valve 26 through the computation of various control factors, thereby controlling the turbine speed, generator output, and steam pressure. The above-described control per se of a steam turbine with the aforementioned control factors or circuits is already known.

In effecting the above-described control, it is desirable from the viewpoint of maintaining stability of the control thereof for signals representing speed and the like to be applied at fixed periods, as much as possible, so as to adjust the opening of valves. Meanwhile, with respect to any rise in the turbine speed resulting from interruption, or the like, of the load or fluctuations of steam pressure in a nuclear power plant, it is extremely important to cope with such situations with high rapid response in order to ensure prevention of turbine overspeed and protection of the nuclear reactor, and so forth. For this reason, an operation processing unit is adopted in the present invention which is capable not only of ensuring control stability by fixing periods and effecting continuous computation but also of improving the response characteristics by shortening those periods.

FIG. 2 shows the operation processing unit of the control system shown in FIG. 1. Specifically, this processing unit includes the following: an operational period timer circuit 1 for controlling the periods of computation; a period operation selection circuit 2 for selecting control factors or blocks to be computed within a given period; an operation instruction circuit 3 for stacking the control factors to be computed and imparting an instruction; an operation processor 4 for actually performing computation on the basis of that instruction; an operation completion determining circuit 5 for determining whether or not all the scheduled operations have been completed within the period; an operation program 6 divided to accommodate each control factor and adapted to store the content of computation; and an idle operation program 7 which exerts no influence on control and effects time adjustment.

It should be noted that the various phases of control of the nuclear power generator turbine are effected as a result of executing the operating program 6.

Figure 3:
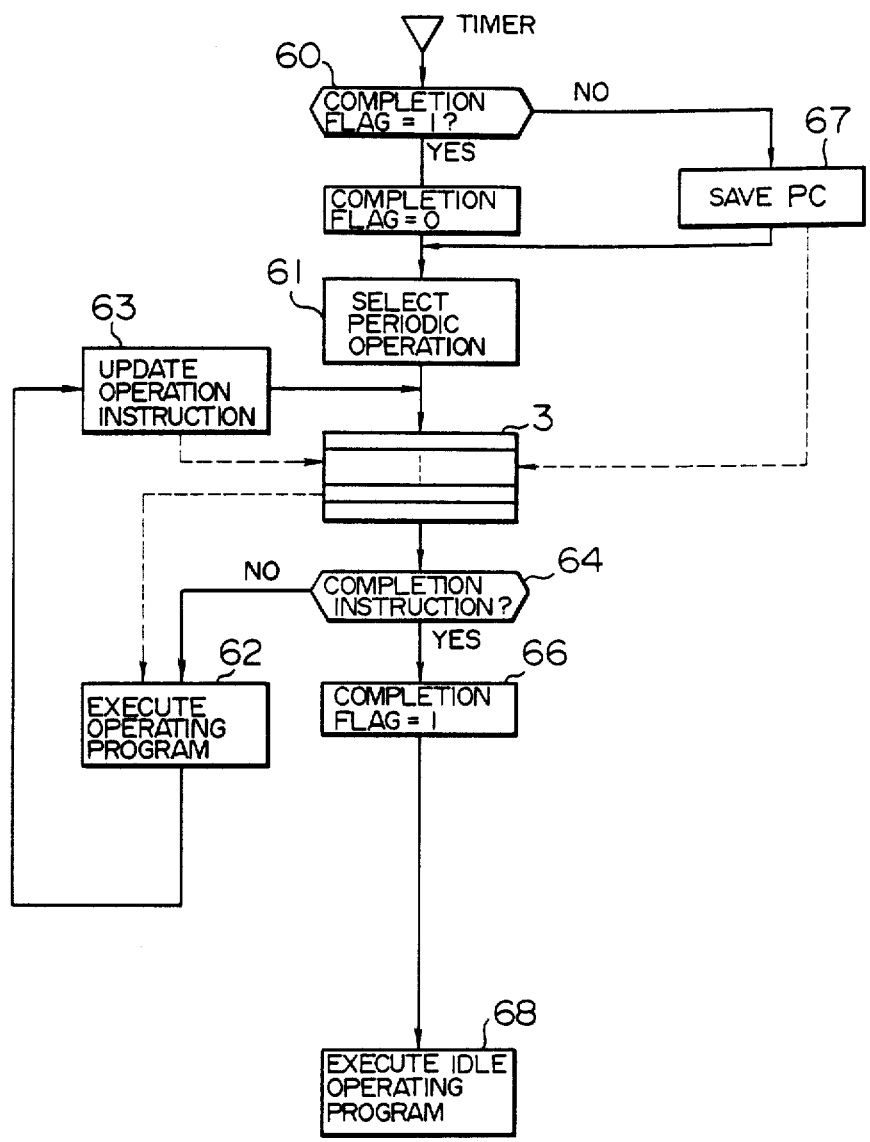
FIG. 3 is a diagram illustrating the operation of the operation processing unit.
Figure 4:
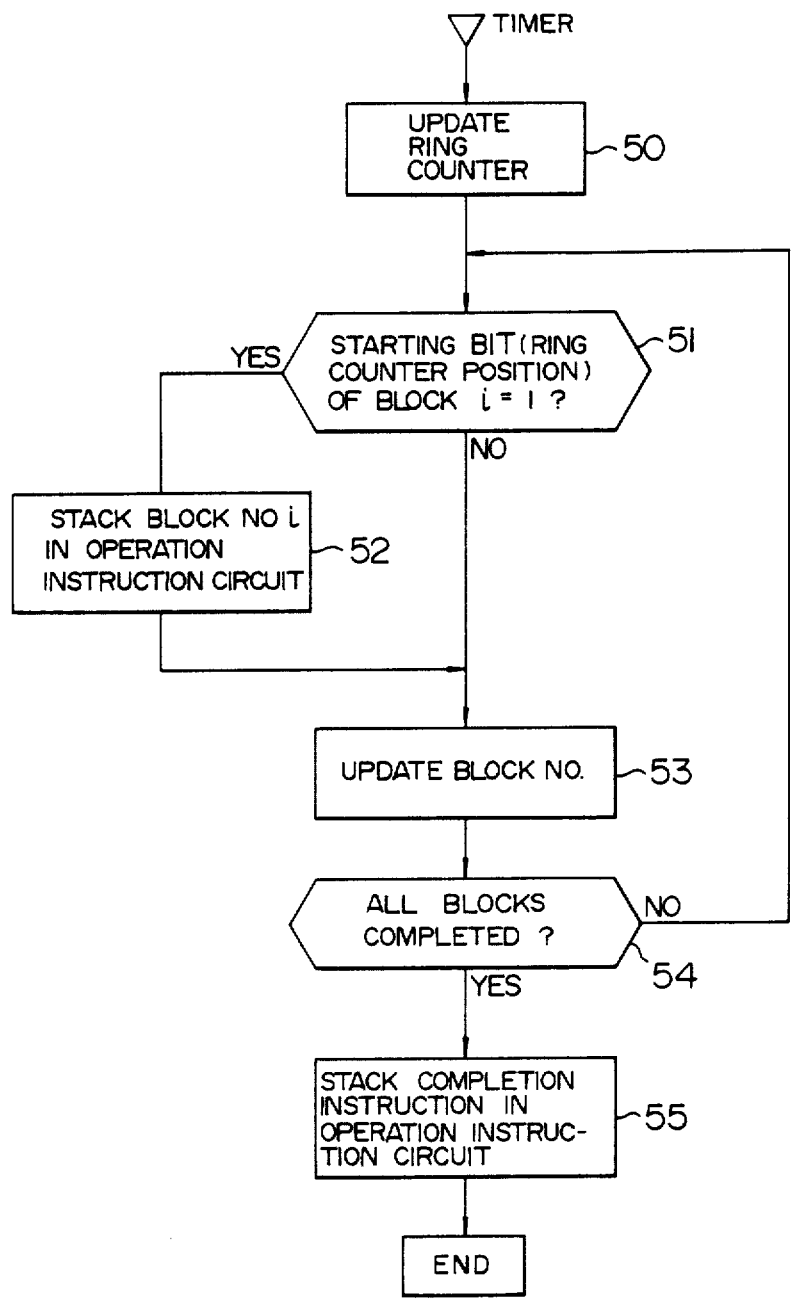
FIG. 4 is a diagram illustrating the operation of a periodic operation selection circuit of the operation processing unit.

Referring now to FIGS. 3 to 5, description will be made of the operation of the above-described operation processing unit. Referring first to FIG. 4, description will be made of the operation of the periodic operation selection circuit 2 for consecutively instructing and stacking control factors or control blocks to be computed into the operation instruction circuit 3. In other words, if an instruction for starting the operation of a predetermined period is issued from a timer circuit for setting operational periods, the periodical operation selection circuit 2 operates as shown in the following steps: A ring counter is updated (Step 50), and determination is made from the count position of the ring counter as to whether or not the starting bit of control block No. 1 is set to '1' (Step 51). If YES is the answer, the operation proceeds to Step 52 to stack the content of control block No. 1 in the operation instruction circuit 3, and the control block number is updated in Step 53. On the other hand, if the starting bit of control block No. 1 is not '1' in Step 51, the operation proceeds directly to Step 53 to update the control block number. Determination is made in Step 54 on the basis of that result as to whether or not the stacking of all the blocks has been completed. If the stacking of all the blocks has not been completed, the operation returns to Step 51 again, and the above-described operation is repeated until the stacking of all the blocks is completed. When the stacking of all the control blocks has been completed, a completion instruction is stacked in the operation instruction circuit 3 in Step 55, and the operation of the periodical operation selection circuit 2 is thereby completed.

In the illustrated embodiment, the control blocks shown in FIG. 5 include a speed/load control block in block No. 1, a pressure control block in block No. 2, a TBV flowrate control block in block No. 3, a CV/IV opening control block in block No. 4, and a TBV opening control block in block No. 5. Their contents are consecutively stacked in the operation instruction circuit 3, as described above.

Referring now to FIG. 3, description will be made of the overall operation of the above-described operation processing unit. First, if an instruction for starting an operation of a predetermined period, e.g., a second period, is issued from the timer circuit 1 in a normal state, determination is made in Step 60 as to whether whether or not a completion flag in operation completion determining circuit 5 has been set to '1' by an instruction for completion of the computation of the preceding period, i.e., the first period. If the completion flag is '1', selection of a periodic operation of the second period is effected in Step 61. In other words, all the control blocks to be computed in the second period and a completion instruction are stacked consecutively in the operation instruction circuit 3 by the periodic operation selection circuit 2. An operating program is thus executed for corresponding control blocks on the basis of instructions stacked in advance in the operation instruction circuit 3 (step 62). The instruction of the operation instruction circuit 3 is updated in Step 63. Thus, the operation of control blocks in the second period is effected consecutively. If a completion instruction is executed (Step 64) after execution of a control operation, and the completion flag in the operation completion determining circuit 5 is set to '1', the operation proceeds to Step 68, where an idle operation is carried out. In other words, a control operation is not effected and adjustment of time is carried out until the timer circuit gives an instruction which indicates the ensuing period.

In the event that the computation of all scheduled control blocks is not completed during the predetermined period, the following operation takes place. As shown in FIG. 5, the computation of control blocks is started when a short time duration t has elapsed after the timer circuit 1 issued an instruction for starting each period, and the arrangement is such that control blocks are stacked in the operation instruction circuit 3 by the periodic operation selection circuit 2 during that time duration t. Accordingly, while an operation of control block No. 5 (FIG. 5) of the second period, for instance, is being carried out, if the timer circuit 1 issues an instruction for starting the ensuing period, i.e., the third period, the execution of the operating program 6 is suspended temporarily (it is suspended for a time duration corresponding to the aforementioned time duration t). At that time, since judgment is made in Step 60 that the completion flag of the previous period, i.e., the second period, has not been set to '1', the operation completion determining circuit 5 saves the content of the program counter (PC) which indicates the position of the operating program being executed, so that the restarting position for the remaining operations is issued to the operation instruction circuit 3. Subsequently, the last completion instruction of the previous period, i.e., the second period, stacked in the operation instruction circuit 3 (which is the instruction for setting the completion flag to '1' and transferring the operation to the idle operation) is canceled by the operation completion determining circuit 5. Thus, the control blocks and completion instruction of the third period are consecutively stacked by the periodic operation selection circuit 2, as described referring to FIG. 4. Consequently, the operating program 6 restarts the aforementioned remaining operations from the point where it had suspended the computation temporarily, jumps the idle operating program, and executes the computation of the control blocks of the third period (Step 62).

It should be noted that the aforementioned saving is also effected when there occurs, for instance, a man-machine interface interrupt instruction from the outside in the midway of the second period, as in the case shown in FIG. 5, and the operation of the operation instruction circuit 3 (i.e., and operation concerning pressure control in FIG. 5) is retained. A program based on the interrupt instruction is executed in the operation processor 4, and in response to the occurrence of the instruction for terminating the interrupt processing the retaining state of the operation instruction circuit 3 is cancelled and the operating program (Step 62) receives from the operation instruction circuit 3 the instruction on the restarting position of the operation which has been saved. Thus, computation is resumed based on the stacked instructions of the second period.

FIG. 5 clearly shows that computation is carried out periodically and continuously. In other words, in the example of FIG. 5, the computation of control blocks No. 1 to No. 5, as well as an idle operation during the subsequent predetermined time duration, is effected consecutively in the normal procedure. In the second period, however, the computation is interrupted temporarily owing to an interrupt for the man-machine interface, such as a request for display of the operational result, and the computation is subsequently resumed from the point where the operation was interrupted. Accordingly, the computation of control block No. 5 is not terminated in the second period. As is apparent from the foregoing description, in this case, an instruction for the position for restarting the computation is set in the operation instruction circuit 3 at the time of starting the third period, the completion instruction of the second period is canceled, and the control blocks of the third period are stacked. Consequently, the computation of the third period is started from the remaining portion of control block No. 5 of the second period. Subsequently, the operations of control blocks Nos. 1–5 of the third period are effected consecutively without carrying out an idle operation.

As is apparent from the above, in the present invention, operational periods are fixed by providing a timer circuit, and in a case where the scheduled control operations have been terminated during, for instance, a first, period, an idle operation is performed until the essuing period sets in, thereby making time adjustment. In addition, for instance, in a case where the scheduled control operations have not been completed during, for instance, a first period, the remaining control operations are performed at the beginning of the second period, and the control operations scheduled for the second period are effected continuously without performing an idle operation. Accordingly, since control operations can be carried out continuously during fixed periods, high response characteristics and stable control can be ensured.

What is claimed is:

1. A process control system for controlling a process in a series of control blocks, said process control system comprising:

timer circuit means for issuing an instruction for starting each of a plurality of time periods permitting the computation of control blocks to occur in time periods of fixed duration;

periodic operation selection circuit means for selecting control blocks to be computed within each time period in response to a starting instruction from said timer circuit;

operation instruction circuit means for stacking control blocks selected by said periodic operation selection circuit means and an instruction for completion of the computation of control blocks and for effecting an idle operation for each time period and for issuing an instruction for consecutively executing the operation of the control blocks and an instruction for performing an idle operation after completion of the operation of the control blocks for each time period; and operation completion determining circuit means, responsive to an instruction from said timer circuit means to start an ensuing time period at a time when computation of control blocks has not been completed within a predetermined time period, for cancelling the instruction for completion of the predetermined time period and for issuing an instruction to start the computation of ensuing time period, beginning with the computation of the remaining control blocks in the predetermined time period, and an instruction for causing said periodic operation selection circuit means to stack the control blocks of the ensuing time period in said operation instruction circuit means.

2. A process control system according to claim 1, adapted for controlling a steam turbine in an electric powser plant, said system further comprising means for receiving signals indicative of the steam pressure and the rotational speed of the steam turbine and indicative of the output of a generator; and means responsive to the indicated steam pressure and turbine speed for generating an output signal for adjusting the opening of a valve means to control steam flow in the steam turbine.

3. A process control system according to claim 2, wherein said periodic operation selection circuit means selects control blocks including a steam turbine speed-load control block, a steam pressure control block, a turbine bypass valve flowrate control block, a control block for controlling the opening of a steam control valve and an intermediate steam stop valve, and a turbine bypass valve opening control block.

4. A method of controlling a process in a series of control blocks, said method comprising the steps of:

instructing the starting of each of a plurality of time periods in such a manner that the computation of control blocks occurs in time periods of fixed duration;

selecting control blocks to be computed within each time period in response to the starting instruction;

stacking selected control blocks and an instruction for completion of each time period;

issuing instructons for consecutively executing the operation of the control blocks and an instruction for performing an idle operation after completion of the operation of the control blocks for each time period; and in response to an instruction to start an ensuing time period at a time when computation of control blocks has not been completed within a predetermined time period, cancelling the instruction for completion of the predetermined time period and issuing an instruction to start the computation of the ensuing time period, beginning with the computation of the remaining control blocks in the predetermined time period and control blocks of the ensuing time period without performing an idle operation in the predetermined time period.

* * * * *